(12) United States Patent
Huang et al.

(10) Patent No.: US 6,438,369 B1
(45) Date of Patent: Aug. 20, 2002

(54) NETWORK DIRECTED SYSTEM SELECTION FOR CELLULAR AND PCS ENHANCED ROAMING

(75) Inventors: Chenhong Huang, Plano; Kim T. Chang, Richardson; Girish Patel, Plano, all of TX (US)

(73) Assignee: Nortel Networks Ltd., St. Laurent (CA)

(*) Notice: Subject to any disclaimer, the term of this patent is extended or adjusted under 35 U.S.C. 154(b) by 0 days.

(21) Appl. No.: 09/461,528

(22) Filed: Dec. 14, 1999

Related U.S. Application Data

(63) Continuation of application No. 08/695,352, filed on Aug. 9, 1996, now Pat. No. 6,058,309.

(51) Int. Cl.$^7$ .............................. H04Q 7/20
(52) U.S. Cl. ............... 455/417; 455/445; 455/432; 455/435; 455/433
(58) Field of Search .................... 455/432, 433, 455/435, 445, 560, 411, 410, 436, 439, 442, 417, 434, 552

(56) References Cited

U.S. PATENT DOCUMENTS

| | | | | |
|---|---|---|---|---|
| 5,222,123 A | * | 6/1993 | Brown et al. ............... | 379/57 |
| 5,329,578 A | * | 7/1994 | Brennan et al. ............. | 379/67 |
| 5,497,412 A | * | 3/1996 | Lannen et al. .............. | 455/435 |
| 5,787,347 A | * | 7/1998 | Yu et al. .................... | 455/440 |
| 5,839,067 A | * | 11/1998 | Jonsson .................... | 455/422 |
| 5,850,604 A | * | 12/1998 | Dufour et al. ............... | 455/435 |
| 5,862,481 A | * | 1/1999 | Kulkarni et al. ............ | 455/432 |
| 5,933,490 A | * | 8/1999 | White et al. ................ | 379/221 |
| 5,978,681 A | * | 11/1999 | Bertacchi ................... | 455/445 |
| 6,044,265 A | * | 3/2000 | Roach, Jr. .................. | 455/419 |
| 6,070,080 A | * | 5/2000 | Madour et al. ............. | 455/417 |

\* cited by examiner

Primary Examiner—Edward F. Urban
Assistant Examiner—Tilahun Gesesse
(74) Attorney, Agent, or Firm—Bruce Garlick; John Crane

(57) ABSTRACT

The present invention relates to a cellular and PCS enhanced roaming arrangement for assuring that a roaming mobile station is serviced outside its home service market be a preferred service provider. A mobile station outside its home market, when attempting to register or initiate a call, will attempt to connect to a remote service provider in the geographic region where it is located in the same manner as it would in the home market. The remote service provider will contact the home service provider seeking, among other things, service information and account status. In the event that the home service provider has more favorable arrangements with another service provider in the geographic region where the mobile station is located, the home service provider will transmit redirection instructions to the remote service provider which is transmitted to the mobile station. The redirection instructions direct the mobile station to attempt to establish communication with an alternative preferred service provider in the geographic region where the mobile station is located. Instructions may also be sent identifying what the mobile station should do in the event communication with the alternative preferred service provider cannot be established.

7 Claims, 5 Drawing Sheets

NETWORK DIRECTED SYSTEM SELECTION FOR CELLULAR AND PCS ENHANCED ROAMING

This patent application is a Continuation of U.S. patent application Ser. No. 08/695,352, filed Aug. 9, 1996 (issued as U.S. Pat. No. 6,058,309 on May 2, 2000), co pending, claims priority thereto pursuant to 35 U.S.C. 102, and which is hereby incorporated by reference in its entirety.

FIELD OF THE INVENTION

The present invention relates to enhanced roaming of mobile stations in cellular and PCS systems. This invention offers a subscriber the ability to use his/her wireless phone or handset, on its most desirable roaming system in any geographic location, without concern for different service providers or air interface technologies. Intelligence in the network (most particularly at the Home Location Register, HLR), as specified in this invention, will always direct the mobile to access and acquire the most favorable system whenever the subscriber is roaming outside his/her home service market.

BACKGROUND OF THE INVENTION

One of the most important and distinguishing features of wireless communications is the ability of the mobile station to roam between systems. While roaming, a mobile station typically will select a system made available by a cellular provider in the geographic area where the subscriber is roaming based on its custom system selection method, which emphasizes finding a system (any system) for service. The draw back of this prior approach is that the mobile station does not have any knowledge whether the selected system is the most desirable system, in the sense of whether a more preferred system in a given market (geographic location) may exist for providing better service in terms of roaming rate and compatible services. This makes roaming between systems a big concern from the end user's perspective, which in the past has directly impacted the growth of the wireless market.

With the introduction of PCS, at any given geographical location, there could eventually be eight wireless systems providing services. Two of them would of course be cellular A-side and B-side service providers at the 800 MHz range. The other six are new comers (Blocks A, B, C, D, E, and F) operating at the 1.9 GHz spectrum. In addition, there are two other factors that have contributed to further confusing the roaming situation even further:

1) In this growing market place, more and more preferred roaming agreements will be established between different service providers in different geographic markets. Considering the fact that today, there are 306 Metropolitan Service Areas MSAs and 428 Rural Service Areas RSAs (each MSA or RSA having 2 cellular operators), and 543 MTAs (Major Trading Area) and BTAs (Basic Trading Area). Each region or area may have up to 6 PCS operators. Because of this large number of operators in the US, the number and level of preferred roaming agreements could soon become overwhelming. With the enactment of the US Telecommunications Act in 1996, more and more alliances and mergers of service providers in the market place are predicted. This creates further confusion to the mobile station as to how it can select a system while roaming having a preferred agreement with its home service provider.

2) With the auction of the PCS spectrum, some service providers now own different segments of the air spectrum in different geographic locations. It is then imperative for mobile stations to be able to access systems provided by the same service provider in different geographic markets to get preferred rates and to preserve the services that the subscriber has with its home base system.

In short, competition in wireless services and service provider's desire to offer seamless roaming will make the wireless market place more dynamic and vibrant, which in turn impacts the mobile station's ability to select a favorable system. It is the purpose of this invention to develop a new method, which relies on the intelligence in the network (particularly the Home Location Register, HLR), to guide the mobile station to a preferred cellular provider in any market into which it roams.

DESCRIPTION OF PRIOR ART

In Cellular mobile operation, the mobile station is programmed by either the operator or the end user to scan the spectrum in a pre-defined sequence to find the home service system. For example, if a mobile's home system is provided by a B-side operator, the mobile station will always scan the B-side channels first when it is turned on, NO MATTER WHERE THE MOBILE IS. If a B-side service provider is not available in the geographic market into which the mobile station has roamed, then, depending upon the pre-defined sequence, the mobile may scan the A-side, or indicate that no service is available in that particular market. It was not heretofore defined in either the standards or in the mobile custom scanning method, for the mobile station to intelligently look for a preferred system that is going to provide the mobile the best service, in terms of the roaming charge, and other factors.

In PCS communications, the way the mobile acquires a system is even more complicated because of the fact that there are up to 6 different. spectrums available, and there are multiple air interfaces. Also, because of the fact that there are microwave interference sources within the PCS spectrum, the frequencies (channel numbers) of pilot channels are not even specified in the standards. For example, in CDMA, there is only a list of candidate channels for the mobile to scan. Given the standardized CDMA system acquisition time of up to 15 seconds to acquire a pilot channel, it is highly impractical for the mobile to scan on its own trying to find the best system in a particular geographic location (i.e., a foreign market).

Even though today the CDMA community is trying to define a handset solution to enhanced roaming, based on pre-programmed sequence of scanning by the service providers, it may not work well at all because of the limited precious mobile station memory. Given the overwhelming number of cellular and PCS systems in service, it is hard to imagine how the mobile will be able to be programmed with information as to preferred systems in all markets. Furthermore, due to the dynamic nature of the wireless market, a handset solution will require periodic updating to provide needed preferred system information. But, updating the list in the mobile has to be originated by the mobile. Considering the fact that the mobile user will have no easy way of knowing that any change in the market place has occurred, this will create nuisance to both the service providers and the end users and is likely to result in unneeded update requests from roaming mobile stations.

SUMMARY OF THE INVENTION

In this invention, we describe a network based solution for the purpose of enhanced roaming, namely, the Network Directed System Selection (NDSS) approach. The Network Directed System Selection feature is a network capability that provides a network based mechanism for a service provider, based on various customer and service provider specified criteria, to automatically direct a user to a desired system. The desired system could be any system available to the subscriber unit, regardless of frequency band (cellular A/B or PCS bands A/B/C/D/E/F) or technology (analog or digital).

The Network Directed System Selection (NDSS) feature consists of features that allow a cellular or PCS service subscriber to register upon a preferred system while they are roaming (i.e., outside of their home system) without any manual intervention by the subscriber. NDSS allows a subscriber unit to be automatically directed by their home service provider to a suggested system, regardless of the frequency band (e. g. cellular A/B or PCS bands A/B/C/D/E/F), and be compatible to the air interfaces supported by the terminal. The NDSS feature also allows a network operator to control access to systems to facilitate testing, load control, and service quality control. For example, when a customer registers on a system, the network may direct the user from that system to another system. The subscriber unit may then remain on the system until power down, or until directed back to the original system by a subsequent message from the NDSS feature, or until handed off to another system. NDSS also allows the subscriber to suppress or desuppress the feature.

BRIEF DESCRIPTIONS OF THE FIGURES

DETAILED DESCRIPTION OF THE INVENTION

Figure 1:
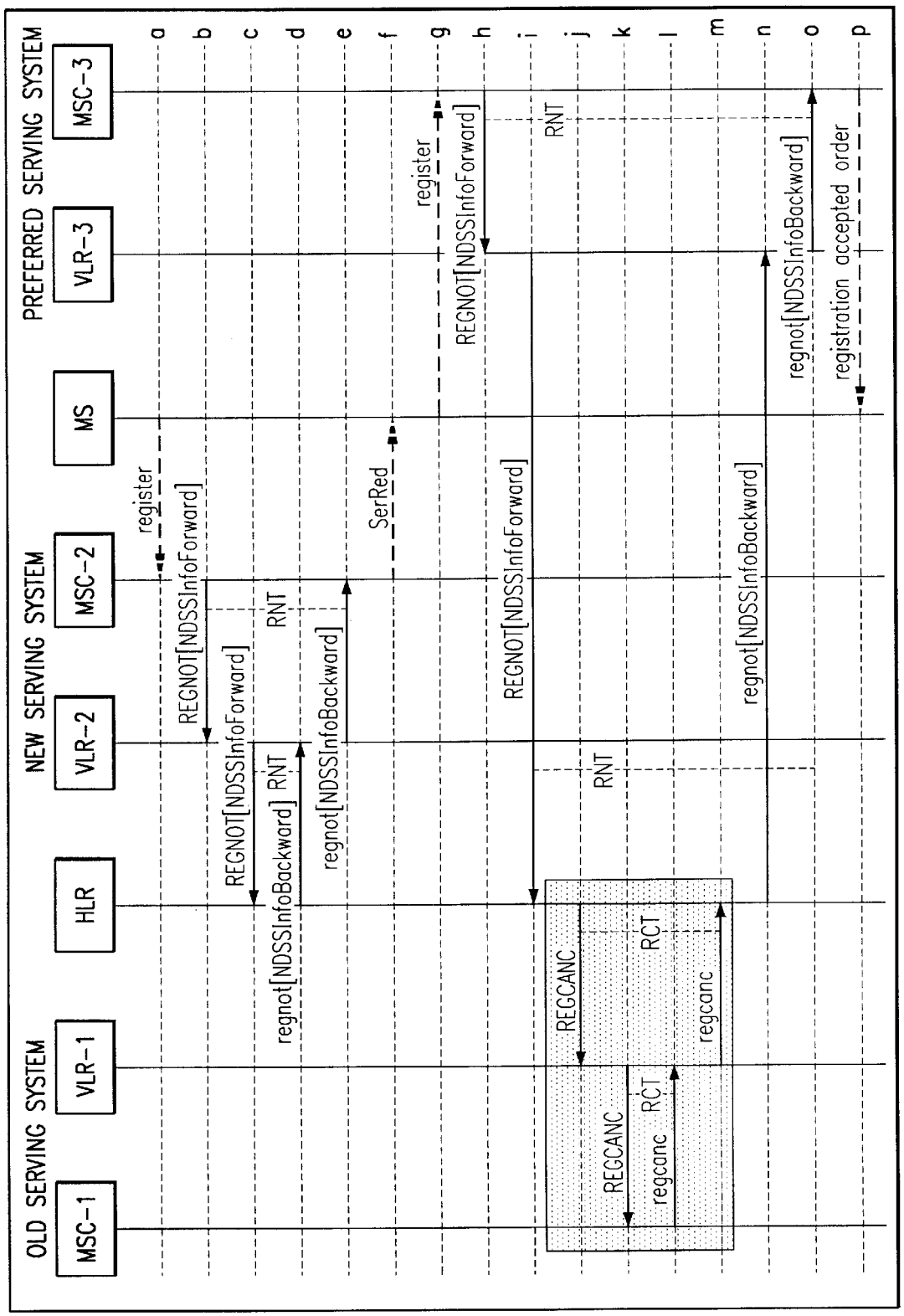
FIG. 1 illustrates a typical example of the intersystem message flow required for an NDSS scenario in which the mobile station (MS) roams from one system to another and initiates the initial registration and validation process, and while registering with the visited system, it is directed by its home service provider to a preferred roaming system.

FIG. 1 illustrates the intersystem message flow required for a Network Directed Systems Selection NDSS scenario in which a mobile station MS roams from one system to another and initiates the initial registration and validation process, and while registering with the newly visited system, it is directed by its home service provider to an alternative but preferred roaming system. The individual steps of the message flow are described in detail as follows:

a. The MS determines that a new serving system has been entered and a registration is needed. Registration may also be needed if the mobile station is first turned on while physically located in the geographic area served by a new serving system. When either of these events occurs, the MS attempts to register with a new serving system (Mobile Switching Center MSC-2).

b. The new serving MSC (MSC-2) includes a computer (not illustrated but associated therewith) which receives a registration notice REGNOT from the MS via MSC-2 and queries the visiting location register VLR (VLR-2) for the mobile switching center MSC-2. This register VLR-2 contains information pertaining to all the mobile stations which are visiting the geographic area served by MSC-2.

c. If the MS is not listed in the VLR-2, a registration notice REGNOT is sent to the Home Location Register HLR, maintained by the home service provider, and its coupled computer (not illustrated) for the MS. The Home Location Register contains information pertaining to the type of service subscribed to by the MS and the status of the subscriber account. Note that the RegistrationNotification response from the VLR to the MSC is contingent upon the response received from the HLR.

d. If the HLR and its coupled computer determine that another system is preferable, MSC-2 is NDSS capable, and the subscriber has not suppressed the NDSS override of the handset's system selection procedure, the HLR and its associated computer send a registration response message (regnot) to the serving system (VLR-2 and its associated computer) indicating an NDSS operation request and specifying the REDIRECT_RECORD and RETURN_IF_FAIL fields. The REDIRECT_RECORD identifies the preferred system in the geographical region of the MS and any necessary parameters for connecting to that system. The RETURN_IF_FAIL field is a two bit field and has several functions. The data in this field functions to instruct the MS to do one of several things. 1. If connection to the preferred service provider (MSC-3) cannot be established, the MS may attempt to reestablish connection with MSC-2. In this case, the field value in binary is 01. 2. Reinitialize communication according to the logic for the MS. In this case, the field value in binary is 10. 3. If the preferred service provider cannot be contacted, then avoid contact with MSC-2 and attempt to access to any other system according to the logic in the MS. In this case, the field value in binary is 11. A-binary field value of 00 is not defined and reserved for possible future alternative use.

The computer associated with the HLR may choose not to send mobile station service profiles in regnot because the service provided by MSC-2 may not be involved if the preferred provider is subsequently connected to by the mobile station MS. The service profiles comprise parameters which identify the types of functions subscribed to by the user of the mobile station MS. Failing to send these parameters with the redirection message may also be done to reduce the communication load between the "home" system and the remote service provider system. The computer associated with the HLR also may not perform location updating in the HLR since MSC-2 is not authorized for service. Such location updating in the HLR is deferred until the servicing remote provider is coupled to the MS.

e. VLR-2 and its associated computer, upon receipt of the regnot message specifying an NDSS operation, removes all record of the MS in VLR-2 if RETURN_IF_FAIL binary value is either 10 or 11.

f. The MSC-2 and its associated computer then sends a Service Redirection message to the mobile station MS, to provide the mobile station information about the preferred system (MSC-3) and the RETURN_IF_FAIL field specification. The Service Redirection message may be sent to the mobile station MS over either the control channel, traffic channel, paging channel or through SMS (Short Message Service).

g. Upon receipt of the Service Redirection message, the MS scans and finds the specified preferred system (MSC-3) and performs registration.

h. The preferred serving MSC (MSC-3) sends a REGNOT to its VLR (VLR-3) and its associated computer.

i. If the MS is not found in the VLR-3, the computer associated with VLR-3 sends a REGNOT to the HLR associated with the MS. Note that the RegistrationNotification response from the VLR-3 to the MSC-3 is contingent upon the response received from the HLR.

j. If the MS was previously registered elsewhere, the HLR sends a REGCANC (registration cancel) to the previously visited system including a computer associated with VLR (VLR-1). The computer associated with this VLR, upon receipt of the cancellation message, essentially removes all record of the MS from its memory.

k. The computer associated with VLR-1 also sends a REGCANC to the previously visited MSC (MSC-1). That MSC, upon receipt of the cancellation message, essentially removes all record of the MS from its memory.

l. MSC-1 sends a registration canceled message (regcanc) to the computer associated with VLR-1.

m. The computer associated with VLR-1 sends a regcanc message to the HLR.

n. If the computer associated with the HLR determines that the MS can be granted service by the preferred provider in the geographic region where MS is currently located, the computer associated with the HLR sends a registration message (regnot) to the computer associated with VLR-3. This notice will include the parameters indicating the types of services subscribed to by the MS.

o. The computer associated with the VLR-3 forwards the regnot message to MSC-3.

p. MSC-3 sends the Registration Accepted Order to the MS.

Figure 2A:
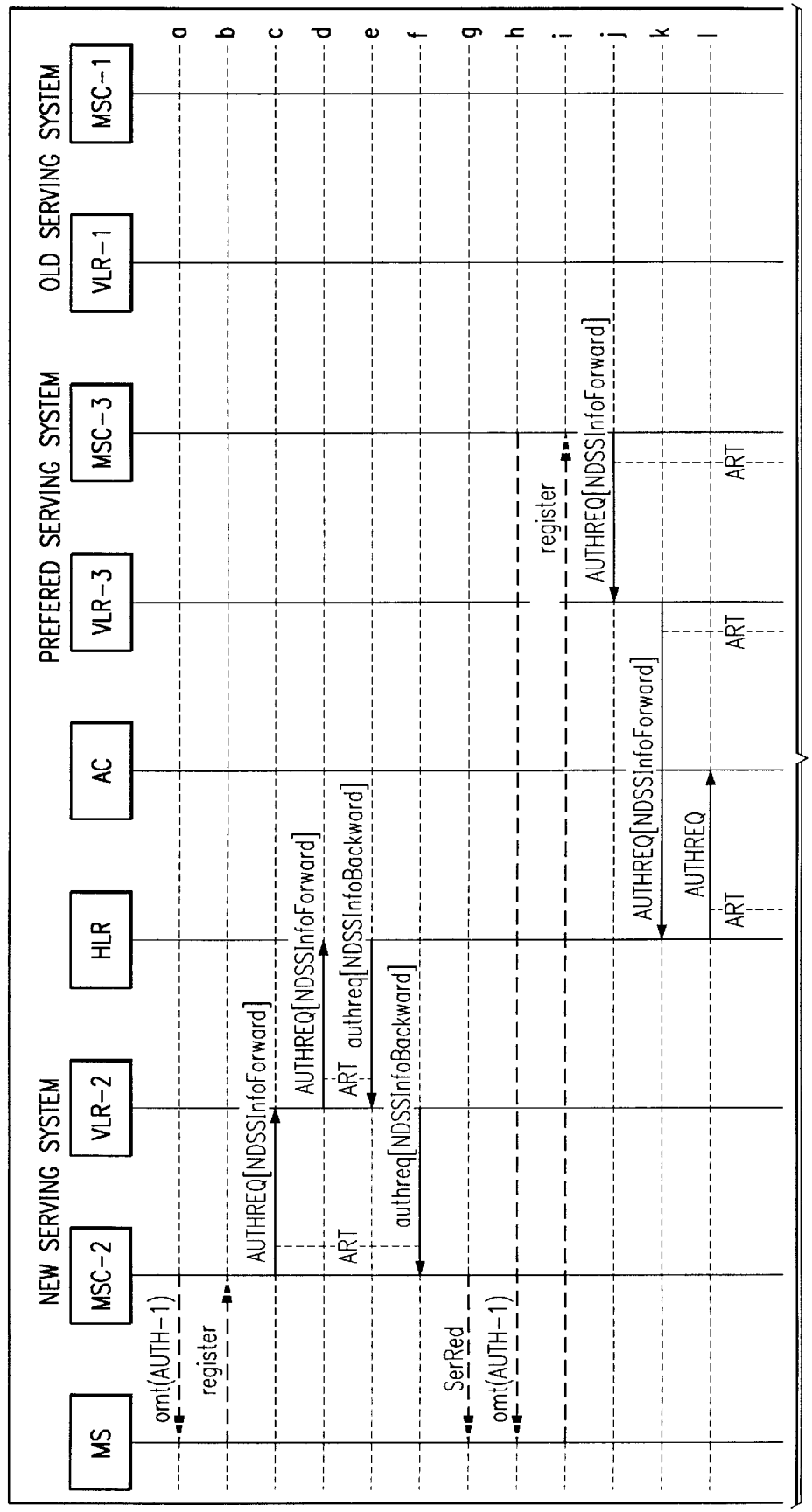
FIG. 2 illustrates a typical example of the intersystem message flow required to support authentication as the MS initiates the initial registration, and while being authenticated, it is directed by its home service provider to a preferred roaming system.
Figure 2B:
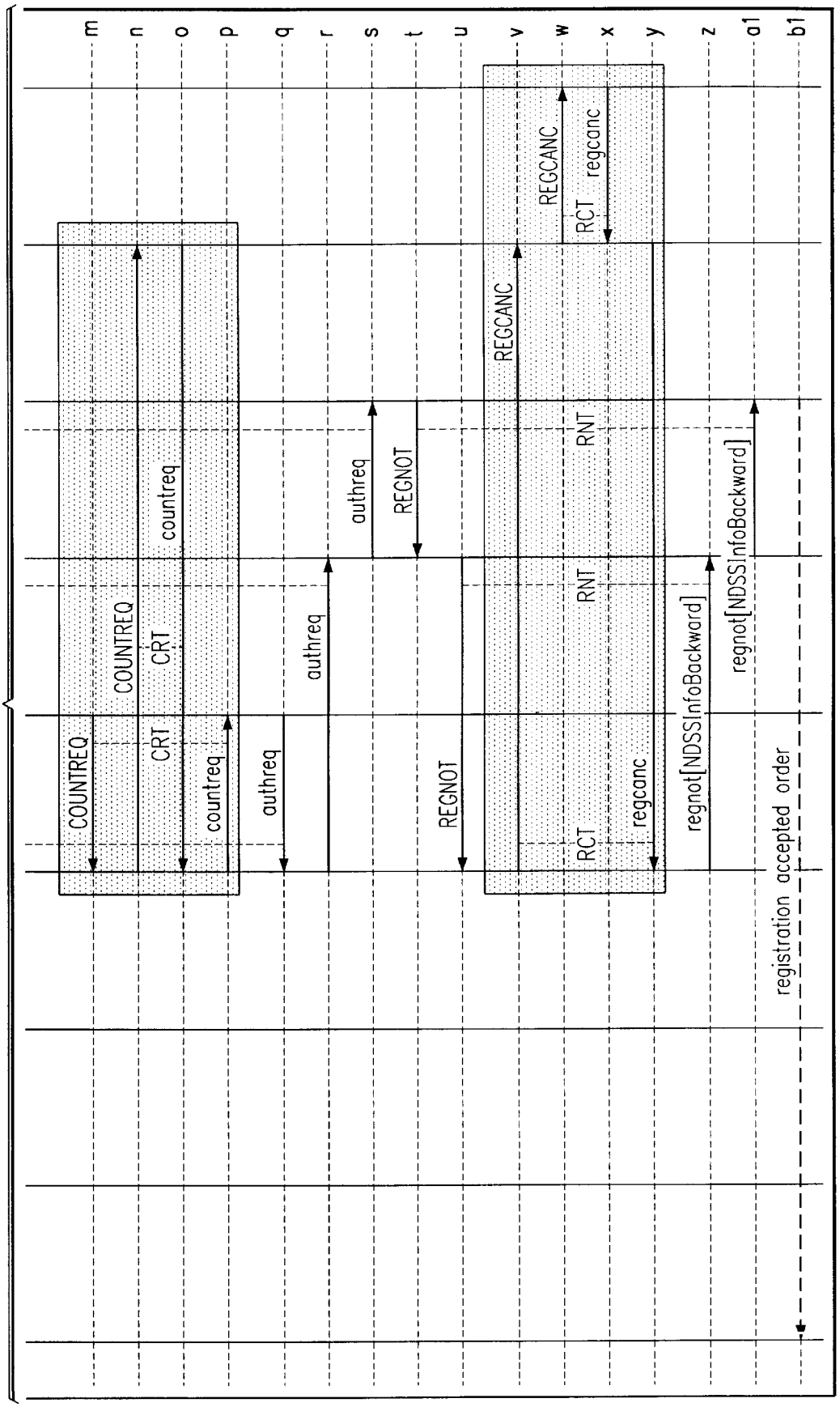

FIG. 2 illustrates the intersystem message flow required to support a roaming MS that has moved from one geographic area where support is provided by one mobile switching center to a second geographic area supported by a second mobile switching center. As a further complication to this situation, authentication is requested as the MS initiates the initial registration, and while being authenticated, it is directed by its home service provider to a preferred roaming system located in the second geographic area. The individual steps of the message flow are described in detail below for this situation:

a. The MS determines from the Overhead Message Train (OMT) that the geographic coverage area of a new serving system has been entered and that the mobile service provider in this geographic area requires authentication on all system accesses (AUTH=1). The Random Number (RAND) to be used for authentication may also be obtained by the MS at this time. If it is not, a zero value is used by the MS as prescribed by TR-45 Authentication.

The MS executes the CAVE algorithm with circuitry in the MS using the shared secret data part A SSD-A currently stored in the MS, electronic serial number ESN, an encoded mobile identification number MIN1 and the random number RAND value to produce a registration Authentication Result (AUTHR).

b. The MS registers at the new Serving Mobile Switching Center (MSC-2), providing its MIN, ESN, AUTHR, CallHistoryCount (COUNT), and a signature RANDC derived from the RAND used to compute AUTHR.

c. The computer (not shown) associated with the MSC-2 verifies RANDC supplied by the MS and generates the appropriate value of RAND for incorporation in an AUTHREQ message which is recorded in the new Serving VLR (VLR-2).

d. The computer associated with MSC-2 and VLR-2 forwards the AUTHREQ message to the computer system (not shown) associated with the Home Location Register HLR for the MS.

e. If the computer associated with the HLR determines that another system is preferable, MSC-2 is NDSS capable, and the subscriber has not suppressed the NDSS override of the handset's system selection procedure, the computer associated with the HLR sends an authreq message to the new serving system computer associated with MSC-2 and VLR-2 indicating an NDSS operation request and specifying the REDIRECT_RECORD and RETURN_IF_FAIL fields in the manner discussed with respect to FIG. 1.

f. The computer associated with VLR-2, upon receipt of the authreq message specifying an NDSS operation, essentially removes all record of the MS from its memory if RETURN_IF_FAIL is disabled. If RETURN_IF_FAIL is enabled, the computer associated with VLR-2 may keep the authentication data related to this MS in the VLR-2 for a certain amount of time, in case the MS fails to find the re-directed system and registers again with authentication parameters within this period of time.

g. The MSC-2 sends a Service Redirection message to the mobile station MS, to provide the mobile station information about the preferred system (MSC-3) and the RETURN_IF_FAIL field specification. The Service Redirection message may be sent to the mobile station MS over either the control channel, traffic channel, paging channel or through SMS (Short Message Service).

h. Upon receipt of the Service Redirection message, the MS scans and finds the specified preferred system (MSC-3) and performs registration.

The MS determines from the Overhead Message Train (OMT) that the geographic coverage area of a new serving system has been entered and that the mobile service provider in this geographic area requires authentication on all system accesses (AUTH=1). The Random Number (RAND) to be used for authentication may also be obtained by the MS at this time. If it is not, a zero value is used by the MS as prescribed by TR-45 Authentication.

The MS executes the CAVE algorithm with circuitry in the MS using the shared secret data part A SSD-A currently stored in the MS, electronic serial number ESN, an encoded mobile identification number MIN1 and the random number RAND value to produce a registration Authentication Result (AUTHR).

i. The MS registers at the preferred Serving MSC (MSC-3), providing its MIN, ESN, AUTHR, CallHistoryCount (COUNT), and RANDC derived from the RAND used to compute AUTHR.

j. The computer (not shown) associated with the MSC-3 verifies RANDC supplied by the MS and generates the appropriate value of RAND for incorporation in an AUTHREQ message which is recorded in the new Serving VLR (VLR-2).

k. The computer associated with VLR-3 forwards the AUTHREQ to the computer associated with the HLR for the MS.

l. The computer associated with the HLR forwards the AUTHREQ to its Authentication Center AC which may comprise another programmed computer of may be the computer associated with the HLR itself.

m–p. If SSD is presently shared with another system, the computer associated with the AC shall perform validation of the MS as described in Section 5.4.8 (Authentication with sharing of SSD) of IS-41-C and go on to Step-a1 below.

Otherwise, the computer associated with the AC verifies the MIN and ESN reported by the MS. The computer associated with the AC then executes the CAVE algorithm using the SSD-A currently stored, ESN, MIN1 and the RAND value to produce a registration Authentication Result (AUTHR).

The computer associated with the AC verifies that the AUTHR received from the MS matches its CAVE results.

The computer associated with the AC then verifies that the COUNT received from the MS is consistent with the value currently stored at the AC.

q. The computer at the AC sends an authentication confirmed message, authreq, to the computer associated with the HLR. The authreq may include SSD and directives to issue a Unique Challenge, to update the MS SSD or to update the MS COUNT according to AC/HLR local administrative practices. These update procedures are described in Sections 5.4.6, 5.4.7, and 5.4.9 of IS-41-C. Alternatively, the authreq may include DenyAccess.

r. The computer at the HLR forwards the authentication confirmed message authreq to the computer associated with VLR-3.

s. the computer associated with VLR-3 forwards the authreq to the MSC-3.

t. Following successful authentication of the MS, MSC-3 sends a REGNOT to the computer associated with VLR-3.

u. The computer associated with VLR-3 forwards the REGNOT to the computer associated with HLR.

v. If the MS was previously registered in another system, the computer associated with HLR sends a registration cancellation message REGCANC to the old Serving VLR (VLR-1).

w. The computer associated with VLR-1 forwards the REGCANC to the old Serving MSC (MSC-1).

x. MSC-1 returns a regcanc to the computer associated with VLR-1.

y. The computer associated with VLR-1 returns a regcanc to the HLR.

z. The computer associated with the HLR records the new location of the MS in its local memory and responds to the REGNOT with a regnot message that includes the information requested by the computer associated by the VLR-3.

a1. The computer associated with VLR-3 forwards the regnot to MSC-3.

b1. MSC-3 sends the Registration Accepted Order to the MS.

Figure 3:
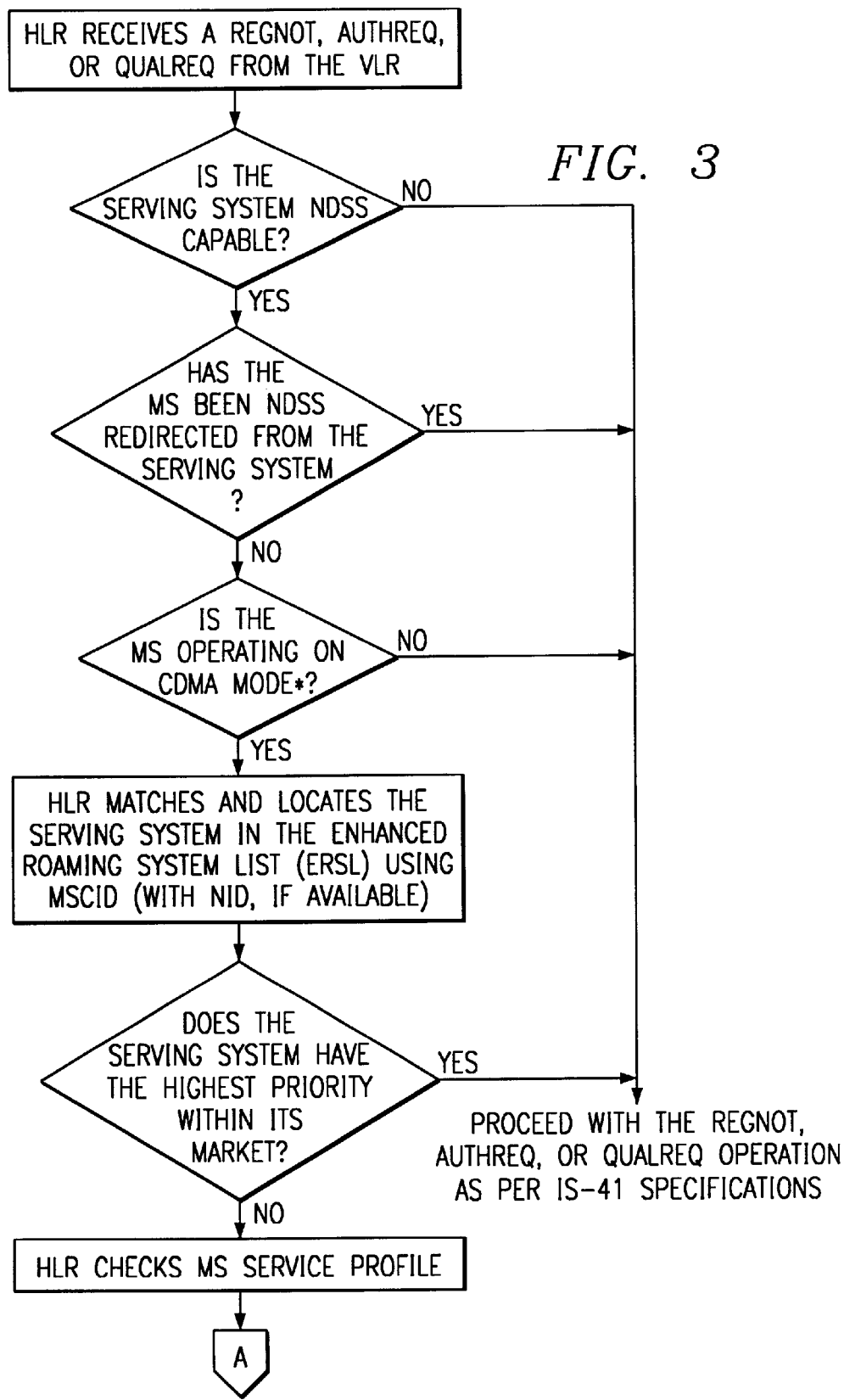
FIGS. 3 and 4 are examples of the flow charts that illustrate how the HLR searches the Enhanced Roaming System List (ERSL) and decides on a preferred system for the MS.
Figure 4:
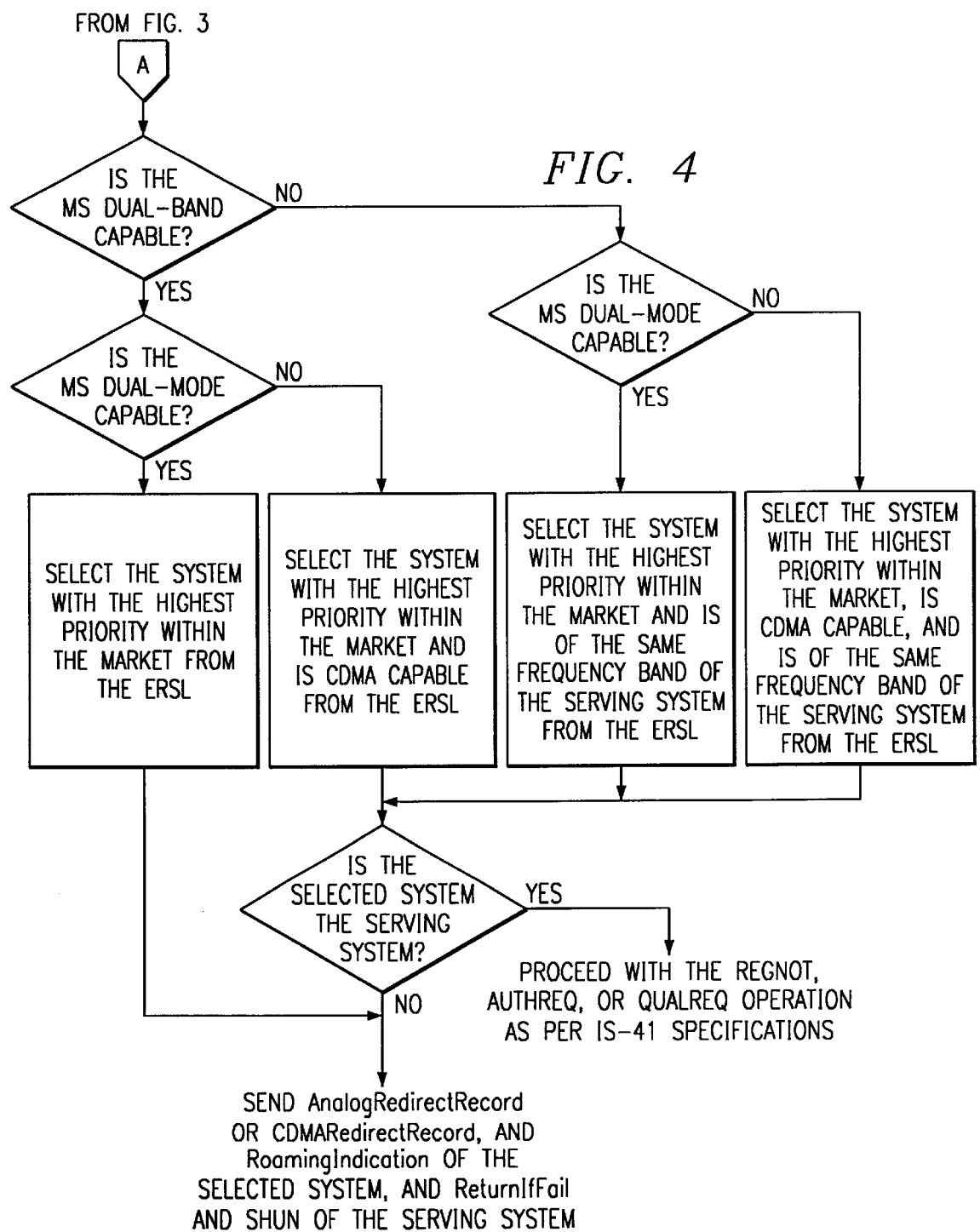

FIGS. 3 and 4 are flow charts that illustrate how the HLR searches the Enhanced Roaming System List (ERSL) and decides on a preferred system for the MS. Those of skill in the art will recognize that other approaches may be employed to perform this function of identifying the preferred service provider in the geographic region where a given MS is roaming.

The following table presents a data structure for the Enhanced Roaming System List(ERSL) for CDMA and Analog air interface technologies. This structure employs MSCID as the main index for scanning the list. NID can be used with MSCID if available. It is understood that similar tables for different air interface technologies are derivatives of this table, and should be recognized as such.

| MSCID | NID_AVAIL | NID | Market | SHUN | Return If Fail | PRI | FREQ | CDMA_AVAIL | CDMA Redirect Record | Analog_AVAIL | Analog Redirect Record | Roaming Indicatio |
|---|---|---|---|---|---|---|---|---|---|---|---|---|
| xxx...x | No | — | 0 | 0 | 1 | 0 | 1900 | Yes | note a | No | — | note c |
| xxx...x | No | — | 0 | 0 | 1 | 1 | 1900 | Yes | a | No | — | c |
| xxx...x | No | — | 1 | 0 | 0 | 0 | 800 | No | — | Yes | note b | c |
| xxx...x | No | — | 1 | 0 | 1 | 0 | 1900 | Yes | a | No | — | c |
| xxx...x | No | — | 1 | 1 | 0 | 1 | 800 | — | — | — | — | — |
| xxx...x | No | — | 0 | 0 | 1 | 0 | 800 | Yes | a | Yes | b | c |
| xxx...x | No | — | 0 | 1 | 0 | 1 | 800 | — | — | — | — | — |
| xxx...x | No | — | 0 | 1 | 0 | 0 | 800 | — | — | — | — | — |
| xxx...x | No | — | 1 | 0 | 1 | 0 | 1900 | Yes | a | No | — | c |

Note:

a. Redirect_Parameter differs according to the access: technology of the serving system. For example, if the serving system is a CDMA system, its REDIRECT_RECORD will be as follows (refer to CDAM for the definitions of the fields):

| Field | Length (bits) |
|---|---|
| BAND_CLASS | 5 |
| EXPECTED_SID | 15 |
| EXPECTED_NID | 16 |
| RESERVED | 4 |
| NUM_CHANS | 4 |
| NUM_CHANS occurrences of the following field: | |
| CDMA_CHAN | 11 |
| RESERVED | 0–7 (as needed) | b. If the serving system is an analog system, its REDIRECT_RECORD will be as follows (refer to CDMA for the definition of the fields):

| Field | Length (bits) |
|---|---|
| EXPECTED_SID | 15 |
| IGNORE_CDMA | 1 |
| SYS_ORDERING | 3 |
| RESERVED | 5 |

Note that SYS_ORDERING should be set to either 'System A only' or 'System B only' based on the corresponding system.

c. ROAMING_INDICATION can be sent to the MS for Enhanced Roaming Display purposes. Support of this feature is optional. ROAMING_INDICATION should be as follows:

| ROAM_INDI | Value (binary) |
|---|---|
| Roaming Indicator On | 00000000 |
| Roaming Indicator Off | 00000001 |
| Roaming Indicator Flashing | 00000010 |
| Out of Neighborhood | 00000011 |
| Out of Building | 00000100 |
| Roaming-Preferred System | 00000101 |
| Roaming-Available System | 00000110 |
| Roaming-Alliance Partner | 00000111 |
| Roaming-Premium Partner | 00001000 |
| Roaming-Full Service Functionality | 00001001 |
| Roaming-Partial Service Functionality | 00001010 |
| System Identifier | 00001011 |
| (Service Provide Defined) | through 00010000 |
| Reserved | 00010001 through 01111111 |
| Available for manufacturer-specific definitions | 10000000 through 11111111 |

The following presents a structure of the service redirection message. A service redirection message SerRed is sent from a remote mobile switching center, such as MSC-2 of FIG. 1, to the mobile station MS, with redirection record and parameters for instructing the mobile station to attempt to register or originate a call at the mobile switching center of a preferred service provider. The service redirection message can be sent on the Control Channel, Paging Channel, Forward Traffic Channel, or via Short Message Service (SMS). When the remote mobile switching center sends a Service Redirection Message on the Forward Traffic Channel, it preferably uses the following variable-length message format:

| Field | Length (bits) |
|---|---|
| MSG_TYPE ('00010110') | 8 |
| ACK_SEQ | 3 |
| MSG_SEQ | 3 |
| ACK_REQ | 1 |
| ENCRYPTION | 2 |
| RETURN_IF_FAIL | 1 |
| SHUN | 1 |
| REDIRECT_TYPE | 1 |
| RESERVED | 4 |
| One occurrence of the following record: | |
| RECORD_TYPE | 8 |
| RECORD_LEN | 8 |
| Type-specific fields | 8 × RECORD_LEN |

MSG_TYPE—Message type.
  The base station sets this field to '00010000'.
ACK_SEQ—Acknowledgement sequence number.
  The base station sets this field to the MSG_SEQ field from the most recently received Access Channel message requiring an acknowledgement from the mobile station addressed by this message.
MSG_SEQ—Message sequence number.
  The base station sets this field to the acknowledgement sequence number for this message.
ACK_REQ—Acknowledgement required indicator.
  If the mobile station is to acknowledge this message, the base station sets this field to '1'. If the mobile station is not to acknowledge this message, the base station sets this field to '0'.
ENCRYPTION—Message encryption indicator.
RETURN_IF_FAIL—Return if fail indicator.
  The base station sets this field to '1' if the mobile station is required to return to the system from which it is being redirected upon failure to obtain service using the redirection criteria specified in this message. Otherwise, the base station sets this field to '0'.
SHUN—Shun indicator.
  The base station sets this field to '1' if the mobile station is required to select, using its custom system selection process, a system other than the system from which it is being redirected upon failure to obtain service using the redirection criteria specified in this message. Otherwise, the base station sets this field to '0'.
REDIRECT_TYPE—Redirect indicator.
  The base station sets the field to the REDIRECT_TYPE value shown in table below to correspond to the desired redirection type.

| Redirection Types | |
|---|---|
| Description | REDIRECT_TYPE (binary) |
| Normal redirection | 0 |
| NDSS redirection | 1 |

RESERVED—Reserved bits.
  The base station sets this field to '0000'.
The base station shall include one occurrence of the following record:

RECORD_TYPE—Redirection record type.

The base station sets the field of the RECORD_TYPE to the value shown in the table below which corresponds to the type of redirection type specified by this record.

Redirection Record Types

| Description | RECORD_TYPE (binary) |
|---|---|
| NDSS off indication | 00000000 |
| Redirection to an analog system as defined in EIA/TIA-553, EIA/TIA-54, TIA/EIA/IS-91, and TIA/EIA/IS-95. | 00000001 |
| Redirection to a CDMA system as defined in TIA/EIA/IS-95 and ANSI J-STD-008. | 00000010 |
| All other RECORD_TYPE values are reserved | |

RECORD_LEN—Redirection record length.
  If RECORD_TYPE equals to '00000000', the base station sets this field to '00000000'. Otherwise, the base station sets this field to the number of octets in the type-specific fields of this redirection record.

Type-specific fields—Redirection record type-specific fields.
  The base station shall include type-specific fields based on the RECORD_TYPE of this redirection record.
  If RECORD_TYPE is equal to '00000000', the base station shall not include the type-specific fields.
  If RECORD_TYPE is equal to '00000001', the base station shall include the following fields:

| Field | Length (bits) |
|---|---|
| EXPECTED_SID | 15 |
| IGNORE_CDMA | 1 |
| SYS_ORDERING | 3 |
| RESERVED | 5 |

EXPECTED_SID—Expected SID.
  If the base station is redirecting the mobile station to a specific system, the base station sets this field to the SID of that system. Otherwise, the base station sets this field to 0.

IGNORE_CDMA—Ignore CDMA Available indicator.
  The base station sets this field to '1' to indicate that the mobile station is to ignore the CDMA Capability Message on the analog system to which it is being redirected. The base station sets this field to '0' to indicate that the mobile station may discontinue service on the system to which it is being redirected if the mobile station receives a CDMA Capability Message with CDMA_AVAIL equal to '1', and the preferred mode of the mobile station is CDMA.SYS_ORDERING—System ordering. The base station sets this field to the SYS_ORDERING value shown in the table below corresponding to the order in which the mobile station is to attempt to obtain service on an analog system.

SYS_ORDERING

| Description | SYS_ORDERING (binary) |
|---|---|
| Attempt to obtain service on either System A or B in accordance with the custom system selection process | 000 |
| Attempt to obtain service on System A only. | 001 |
| Attempt to obtain service on System B only. | 010 |
| Attempt to obtain service on System A first. If unsuccessful, attempt to obtain service on System B. | 011 |
| Attempt to obtain service on System B first. If unsuccessful, attempt to obtain service on System A. | 100 |
| Attempt to obtain service on either System A or System B. If unsuccessful, attempt to obtain service on the alternate system (System A or System B). | 101 |
| All other SYS_ORDERING values are reserved | |

RESERVED—Reserved bits.
  The base station sets this field to '00000'.
  If RECORD_TYPE is equal to '00000010', the base station shall include the following fields:

| Subfield | Length (bits) |
|---|---|
| BAND_CLASS | 5 |
| EXPECTED_SID | 15 |
| EXPECTED_NID | 16 |
| RESERVED | 4 |
| NUM_CHANS | 4 |
| NUM_CHANS occurrences of the following field: | |
| CDMA_CHAN | 11 |
| RESERVED | 0–7 (as needed) |

BAND_CLASS—Band class.
  The base station sets this field to the CDMA band class, as specified in TSB58.
EXPECTED_SID—Expected SID.
  If the base station is redirecting the mobile station to a specific system, the base station sets this field to the SID of that system. Otherwise, the base station sets this field to 0.
EXPECTED_NID—Expected NID.
  If the base station is redirecting the mobile station to a specific network, the base station set this field to the NID of that network. Otherwise, the base station sets this field to 65535.
RESERVED—Reserved bits.
  The base station sets this field to '0000'.
NUM_CHANS—Number of CDMA Channels.
  The base station sets this field to the number of occurrences of the CDMA_CHAN field in this record.
CDMA_CHAN—CDMA Channel number.
  For each CDMA Channel on which the mobile station is to attempt to acquire a CDMA system, the base station shall include one occurrence of this field specifying the associated CDMA Channel number.
RESERVED—Reserved bits.
  The base station shall add reserved bits as needed in order to make the length of the record equal to an integer number of octets. The base station sets these bits to '0'.

When the base station sends a Service Redirection Message on the Paging Channel, it preferably will use the following variable-length message format:

| Field | Length (bits) |
|---|---|
| MSG_TYPE ('00010000') | 8 |
| ACK_SEQ | 3 |
| MSG_SEQ | 3 |
| ACK_REQ | 1 |
| VALID_ACK | 1 |
| ADDR_TYPE | 3 |
| ADDR_LEN | 4 |
| ADDRESS | 8 × ADDR_LEN |
| RETURN_IF_FAIL | 1 |
| SHUN | 1 |
| REDIRECT_TYPE | 1 |
| One occurrence of the following record: | |
| RECORD_TYPE | 8 |
| RECORD_LEN | 8 |
| Type-specific fields | 8 × RECORD_LEN |

VALID_ACK—Valid acknowledgement indicator.
To acknowledge the most recently received Access Channel message from the mobile station, the base station sets this field to '1'. If this message does not acknowledge the most recently received Access Channel message from the mobile station, the base station sets this field to '0'.

ADDR_TYPE—Address type.

ADDR_LEN—Address field length.

ADDRESS—Mobile station address.

All definitions of other fields are the same as those in the service redirection message on the Traffic Channel.

The above description has been directed to describing the invention in terms of the drawings which are illustrative of the preferred embodiment of the invention, those of skill in this art will recognize that various changes in form can be made without departing from the spirit and scope of the invention as defined in the following claims.

What is claimed is:

1. A method for redirecting a mobile station to a preferred cellular/PCS service provider when the mobile station is not in its home service market comprising the steps of:

receiving a message identifying the remote switching center for the current remote service provider on which the cellular mobile station is attempting to register or originate a call;

determining from the identification of the remote mobile switching center and the capabilities of said mobile station attempting to register or originate a call whether the remote mobile switching center is the most preferred cellular/PCS provider; and sending to the remote switching center a return message with a redirection record and parameters if said remote mobile switching center does not belong to the preferred cellular/PCS provider, said redirection record including one of at least two instructions for execution by the mobile station attempting to register or originate a call comprising one of:

a.) instructions to establish communication with a different and preferred service provider but if that cannot be done, reestablish communication with the current remote service provider;

b.) instructions to establish communication with a different and preferred service provider but if that cannot be done, attempt to establish communication with any other service provider except the current remote service provider.

2. The method of claim 1 where said determining step includes determining the services subscribed to by the mobile station seeking to register or originate a call and including in said redirection record and parameters data identifying the services subscribed to by said mobile station seeking to register or originate a call.

3. A method for redirecting a mobile station to a preferred cellular/PCS service provider when the mobile station is not in its home service market comprising the steps of:

receiving a notification message identifying the remote mobile switching center on which the cellular mobile station is attempting to register or originate a call;

determining from the identification of the remote mobile switching center and the capabilities of said mobile station attempting to register or originate a call whether the remote mobile switching center belongs to the most preferred cellular/PCS; and sending to said remote switching center a return message with a redirection record, said redirection record including one of at least two instructions for execution by the mobile station attempting to register or originate a call comprising one of:

a.) instructions to establish communication with a different and preferred service provider but if that cannot be done, reestablish communication with the current remote service provider; or b.) instructions to establish communication with a different and preferred service provider and if that cannot be done, attempt to establish communication with any other service provider except the current remote service provider.

4. The method of claim 3 wherein said notification message comprises either an authentication request message, a registration notification message or a qualification request message.

5. A method for redirecting a cellular/PCS mobile station to request service from a preferred cellular/PCS service provider when the mobile station is not in its home service market comprising the steps of:

receiving at a remote switching center a request for service from the mobile station;

forwarding data identifying at least the mobile station requesting service and the identify of the mobile switching center where the mobile station is seeking service;

receiving at the remote mobile switching center a return result indicating that the mobile station should be redirected to an alternate preferred service provider, the return result including one of at least two instructions comprising:

a.) instructions to establish communication with a different and preferred service provider but if that cannot be done reestablish communication with the remote service provider where service was initially sought;

b.) instructions to establish communication with a different and preferred service provider but if that cannot be done, attempt to establish communication with any other service provider except the current remote service provider; and sending the return result to the mobile station from the remote mobile switching center.

6. A method for redirecting a cellular/PCS mobile station to seek service from an alternative preferred service provider in the remote service market where the mobile station is located comprising the steps of:

a.) receiving at the mobile switching center serving the mobile station, a request to register or to initiate a call;

b.) transmitting data requesting to register or initiate a call, the transmitted data indicating at least the identity of the mobile switching center from which the data is transmitted and the identity of the mobile station requesting to register or initiate a call;

c.) receiving data including at least redirection instructions for the mobile station seeking to register or initiate a call in the geographic region where the mobile station is physically located the received data including one of at least two instructions comprising:

1.) instructions to establish communication with a different and preferred service provider but if that cannot be done, reestablish communication with the remote service provider where service was initially sought;

2.) instructions to establish communication with a different and preferred service provider and if that cannot be done, attempt to establish communication with any other service provider except the remote service provider where service was initially sought; and d.) transmitting said redirection instructions to the mobile station seeking to register or initiate a call.

7. The method of claim 6 additionally including the steps of:

receiving, at the computer serving the home service market for the mobile station, said transmitted data from the mobile switching center serving the mobile station;

determining whether the mobile switching center serving the mobile station is the preferred service provider in the geographic region where the mobile station is located and if the switching center serving the mobile station is not the preferred service provider generating redirection instructions for the mobile station to identify the preferred service provider; and transmitting the redirection instructions to the mobile switching center serving the mobile station.

* * * * *